United States Patent
He et al.

(10) Patent No.: US 11,277,281 B2
(45) Date of Patent: Mar. 15, 2022

(54) PROVIDER EDGE DEVICE AND METHOD IMPLEMENTED THEREON FOR ETHERNET VIRTUAL PRIVATE NETWORK

(71) Applicant: Telefonaktiebolaget LM Ericsson (publ), Stockholm (SE)

(72) Inventors: Jiang He, Beijing (CN); Haifeng Qu, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 39 days.

(21) Appl. No.: 16/772,403

(22) PCT Filed: Dec. 18, 2017

(86) PCT No.: PCT/CN2017/116975
§ 371 (c)(1),
(2) Date: Jun. 12, 2020

(87) PCT Pub. No.: WO2019/119220
PCT Pub. Date: Jun. 27, 2019

(65) Prior Publication Data
US 2021/0083901 A1 Mar. 18, 2021

(51) Int. Cl.
*H04L 12/46* (2006.01)
*H04L 45/50* (2022.01)

(52) U.S. Cl.
CPC ...... *H04L 12/4645* (2013.01); *H04L 12/4633* (2013.01); *H04L 12/4675* (2013.01); *H04L 45/50* (2013.01)

(58) Field of Classification Search
CPC ............. H04L 12/4625; H04L 12/4633; H04L 12/4675; H04L 45/50; H04L 12/4645
See application file for complete search history.

(56) References Cited

U.S. PATENT DOCUMENTS 8,953,590 B1 * 2/2015 Aggarwal ............... H04L 45/74
370/389
10,666,459 B1 * 5/2020 Sajassi .................... H04L 45/50
(Continued)

FOREIGN PATENT DOCUMENTS

| CN | 105099846 A | 11/2015 |
|---|---|---|
| WO | WO2015165311 A1 | 11/2015 |

OTHER PUBLICATIONS

International Search Report and Written Opinion of the International Searching Authority, PCT/CN2017/116975, dated Jun. 29, 2018, 9 pages.
(Continued)

*Primary Examiner* — Mohamed A. Wasel
(74) *Attorney, Agent, or Firm* — Christopher & Weisberg, P.A.

(57) ABSTRACT

Provided are a provider edge (PE) device and a method for Ethernet virtual private network (EVPN). A first PE device performs label assignment procedure with a second PE device such that the first and second PE devices share an Ethernet segment identifier (ESI)-excluded label and know a correspondence between the ESI-excluded label and a label combination of an ESI label and a VPN label. The first PE device encapsulates a packet of broadcast, unknown unicast or multicast (BUM) traffic, with the ESI-excluded label instead of the label combination. The first PE device sends the encapsulated packet to the second PE device.

24 Claims, 4 Drawing Sheets

(56) References Cited

U.S. PATENT DOCUMENTS

| | | | |
|---|---|---|---|
| 2011/0032843 A1* | 2/2011 | Papp | H04L 45/50 370/254 |
| 2011/0286452 A1 | 11/2011 | Balus et al. | |
| 2014/0126422 A1* | 5/2014 | Bragg | H04L 12/4633 370/255 |
| 2016/0261487 A1* | 9/2016 | Singh | H04L 12/4641 |
| 2018/0309596 A1* | 10/2018 | Brissette | H04L 12/4679 |
| 2020/0287826 A1* | 9/2020 | Wang | H04L 12/4679 |

OTHER PUBLICATIONS

Sajassi, A., Ed., "BGP MPLS-Based Ethernet VPN," Internet Engineering Task Force (IETF) RFC 7432, Feb. 2015, 56 pages.
Extended European Search Report, European Patent Application No. 17935769.4, dated Jul. 1, 2021, 9 pages.
"Ethernet Services using BGP MPLS Based Ethernet VPNs (EVPN)," ITU-T Draft; Study Period 2017-2020; Study Group 15, International Telecommunication Union, Geneva, CH; TR-350 Issue 2, Sep. 1, 2017 (XP044212393) 66 pages.

* cited by examiner

PROVIDER EDGE DEVICE AND METHOD IMPLEMENTED THEREON FOR ETHERNET VIRTUAL PRIVATE NETWORK

CROSS REFERENCE TO RELATED APPLICATIONS

This application is a 35 U.S.C. § 371 national stage application of PCT International Application No. PCT/CN2017/116975 filed on Dec. 18, 2017, the disclosure and content of which is incorporated by reference herein in its entirety.

TECHNICAL FIELD

Embodiments of the disclosure generally relate to network communication, and, more particularly, to a provider edge (PE) device and a method implemented thereon for Ethernet virtual private network (EVPN).

BACKGROUND

This section introduces aspects that may facilitate better understanding of the present disclosure. Accordingly, the statements of this section are to be read in this light and are not to be understood as admissions about what is in the prior art or what is not in the prior art.

With the development of technologies for data center deployments, there have emerged a new set of requirements, such as multihoming and redundancy, multicast optimization, provisioning simplicity, flow-based load balancing, and multipathing. These requirements are difficult to fulfill for current layer-2 VPN (L2VPN) solutions such as virtual private local area network (LAN) service (VPLS). To meet these requirements, the Internet engineering task force (IETF) has proposed, in request for comments (RFC) 7432, a new VPN solution called Ethernet VPN (EVPN). It is a border gateway protocol (BGP) multi-protocol label switching (MPLS)-based solution.

A typical scenario in EVPN is a customer edge (CE) being multihomed to two or more PEs. To avoid a forwarding loop for multi-destination traffic in this scenario, EVPN introduces split-horizon mechanism. Specifically, every broadcast, unknown unicast or multicast (BUM) packet originating from an ingress PE is encapsulated with an MPLS label that identifies the Ethernet segment of origin. This label is referred to as Ethernet segment identifier (ESI) label. Then, the packet is sent out through ingress replication or through point to multipoint (P2MP) label switched path (LSP). An egress PE, once receiving this packet, forwards the packet to a port list excluding the Ethernet segment indicated by the ESI label. The ESI label together with a VPN label uniquely identifies the broadcast port list on the egress PE.

For the above existing forwarding solution, there is still some room for improvement.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved forwarding solution for EVPN.

According to one aspect of the disclosure, there is provided a method implemented at a first PE device in an EVPN. The method comprises performing label assignment procedure with a second PE device such that the first and second PE devices share an ESI-excluded label and know a correspondence between the ESI-excluded label and a label combination of an ESI label and a VPN label. The method further comprises encapsulating a packet of BUM traffic, with the ESI-excluded label instead of the label combination. The method further comprises sending the encapsulated packet to the second PE device.

In an embodiment of the disclosure, performing label assignment procedure with the second PE device comprises receiving, from the second PE device, a message that comprises the ESI label, the VPN label and the ESI-excluded label. The encapsulated packet is sent to the second PE device through ingress replication.

In an embodiment of the disclosure, performing label assignment procedure with the second PE device comprises generating, in correspondence with the label combination of the ESI and VPN labels, the ESI-excluded label. Performing label assignment procedure with the second PE device further comprises sending, to the second PE device, a message that comprises the ESI label, the VPN label and the ESI-excluded label. The encapsulated packet is sent to the second PE device through P2MP LSP.

In an embodiment of the disclosure, the message is an advertisement of BGP comprising: information about Inclusive Multicast Ethernet Tag Route including the VPN label; and an extended community including the ESI label and the ESI-excluded label.

In an embodiment of the disclosure, each ESI-excluded label is configured to uniquely identify a different egress broadcast port list on the second PE.

According to another aspect of the disclosure, there is provided a method implemented at a second PE device in an EVPN. The method comprises performing label assignment procedure with a first PE device such that the first and second PE devices share an ESI-excluded label and know a correspondence between the ESI-excluded label and a label combination of an ESI label and a VPN label. The method further comprises receiving, from the first PE device, a packet of BUM traffic that comprises the ESI-excluded label instead of the label combination. The method further comprises determining the ESI-excluded label from the packet of BUM traffic. The method further comprises flooding the packet of BUM traffic according to the ESI-excluded label.

In an embodiment of the disclosure, performing label assignment procedure with the first PE device comprises generating, in correspondence with the label combination of the ESI and VPN labels, the ESI-excluded label. Performing label assignment procedure with the first PE device further comprises sending, to the first PE device, a message that comprises the ESI label, the VPN label and the ESI-excluded label. The packet of BUM traffic is received from the first PE device through ingress replication.

In an embodiment of the disclosure, performing label assignment procedure with the first PE device comprises receiving, from the first PE device, a message that comprises the ESI label, the VPN label and the ESI-excluded label. The packet of BUM traffic is received from the first PE device through P2MP LSP.

According to another aspect of the disclosure, there is provided a first PE device in an EVPN. The first PE device comprises a processor and a memory. The memory contains instructions executable by the processor, whereby the first PE device is operative to perform label assignment procedure with a second PE device such that the first and second PE devices share an ESI-excluded label and know a correspondence between the ESI-excluded label and a label combination of an ESI label and a VPN label. The first PE device is further operative to encapsulate a packet of BUM traffic, with the ESI-excluded label instead of the label combination. The first PE device is further operative to send the encapsulated packet to the second PE device.

In an embodiment of the disclosure, the first PE device is operative to perform label assignment procedure with the second PE device by receiving, from the second PE device, a message that comprises the ESI label, the VPN label and the ESI-excluded label. The first PE device is operative to send the encapsulated packet to the second PE device through ingress replication.

In an embodiment of the disclosure, the first PE device is operative to perform label assignment procedure with the second PE device by generating, in correspondence with the label combination of the ESI and VPN labels, the ESI-excluded label. The first PE device is operative to perform label assignment procedure with the second PE device by sending, to the second PE device, a message that comprises the ESI label, the VPN label and the ESI-excluded label. The first PE device is operative to send the encapsulated packet to the second PE device through P2MP LSP.

In an embodiment of the disclosure, the processor comprises a chipset capable of supporting MPLS label push, pop and forwarding.

According to another aspect of the disclosure, there is provided a second PE device in an EVPN. The second PE device comprises a processor and a memory. The memory contains instructions executable by the processor, whereby the second PE device is operative to perform label assignment procedure with a first PE device such that the first and second PE devices share an ESI-excluded label and know a correspondence between the ESI-excluded label and a label combination of an ESI label and a VPN label. The second PE device is further operative to receive, from the first PE device, a packet of BUM traffic that comprises the ESI-excluded label instead of the label combination. The second PE device is further operative to determine the ESI-excluded label from the packet of BUM traffic. The second PE device is further operative to flood the packet of BUM traffic according to the ESI-excluded label.

In an embodiment of the disclosure, the second PE device is operative to perform label assignment procedure with the first PE device by generating, in correspondence with the label combination of the ESI and VPN labels, the ESI-excluded label. The second PE device is operative to perform label assignment procedure with the first PE device by sending, to the first PE device, a message that comprises the ESI label, the VPN label and the ESI-excluded label. The second PE device is operative to receive the packet of BUM traffic from the first PE device through ingress replication.

In an embodiment of the disclosure, the second PE device is operative to perform label assignment procedure with the first PE device by receiving, from the first PE device, a message that comprises the ESI label, the VPN label and the ESI-excluded label. The second PE device is operative to receive the packet of BUM traffic from the first PE device through P2MP LSP.

According to another aspect of the disclosure, there is provided a computer program product. The computer program product comprises instructions which when executed by at least one processor, cause the at least one processor to perform the method according to the above aspect.

According to another aspect of the disclosure, there is provided a computer readable storage medium. The computer readable storage medium comprises instructions which when executed by at least one processor, cause the at least one processor to perform the method according to the above aspect.

According to another aspect of the disclosure, there is provided a first PE device in an EVPN. The first PE device comprises a label assignment module for performing label assignment procedure with a second PE device such that the first and second PE devices share an ESI-excluded label and know a correspondence between the ESI-excluded label and a label combination of an ESI label and a VPN label. The first PE device further comprises an encapsulation module for encapsulating a packet of BUM traffic, with the ESI-excluded label instead of the label combination. The first PE device further comprises a sending module for sending the encapsulated packet to the second PE device.

According to another aspect of the disclosure, there is provided a second PE device in an EVPN. The second PE device comprises a label assignment module for performing label assignment procedure with a first PE device such that the first and second PE devices share an ESI-excluded label and know a correspondence between the ESI-excluded label and a label combination of an ESI label and a VPN label. The second PE device further comprises a reception module for receiving, from the first PE device, a packet of BUM traffic that comprises the ESI-excluded label instead of the label combination. The second PE device further comprises a determination module for determining the ESI-excluded label from the packet of BUM traffic. The second PE device further comprises a flooding module for flooding the packet of BUM traffic according to the ESI-excluded label.

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

As mentioned above, EVPN introduces split-horizon mechanism to handle BUM traffic. However, conventional commercial switching chipsets do not support the BUM handling behavior on an egress PE. That is, it is not supported to use combined <ESI, VPN> labels to determine the egress broadcast port list.

Specifically, in the case of ingress replication where labels are downstream assigned, the BUM handling behavior is not a typical MPLS forwarding behavior. This is problematic in that most commercial switching chipsets do not support such behavior. In the case of P2MP where labels are upstream assigned, the lookup of labels must be in specific context label spaces. This is problematic in that most commercial switching chipsets do not support such context aware forwarding.

The recently released chipsets have begun to support the BUM handling behavior on an egress PE by adding specific processing logic to data path. However, they only occupy a very small deployment part in the market. Most deployment parts have been occupied by the conventional switching chipsets. To support EVPN, the most deployment parts have to be replaced. This will lead to high cost and introduce a heavy impact (e.g., increasing the system complexity), which is undesirable for both service providers and clients.

Access control list (ACL) functionality inside a network device may implement such forwarding behavior. However, ACL resource (usually in the form of ternary content addressable memory simply referred to as TCAM) has already been well planned and allocated on commercial network devices. There is no enough resource left for so many <ESI, VPN> combined forwarding rules. This is only possible in theory but infeasible for production.

The present disclosure proposes an improved forwarding solution for EVPN. Hereinafter, the solution will be described in detail with reference to FIGS. 1-7.

Figure 1:
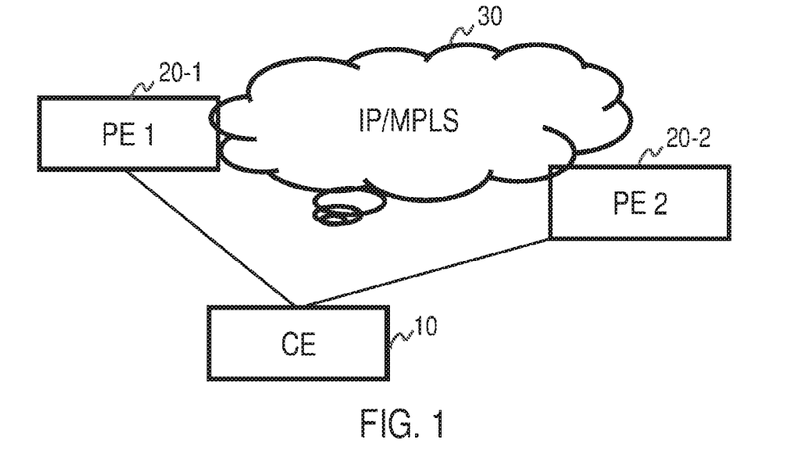
FIG. 1 is a schematic diagram showing a communication system into which an embodiment of the disclosure is applicable.

FIG. 1 is a schematic diagram showing a communication system into which an embodiment of the disclosure is applicable. The communication system may be used to implement an EVPN. As shown, the communication system comprises a customer edge (CE) device 10, two provider edge (PE) devices 20-1 and 20-2 (simply denoted as PE 1 and PE 2), and an Internet protocol (IP)/multi-protocol label switching (MPLS) network 30. Although two PE devices are shown in FIG. 1, there may be more PE devices connected to the CE device 10. Note that only one side of the EVPN is shown in FIG. 1 for brevity. At any other side of the EVPN, there are also PE and CE devices connected to the IP/MPLS network 30.

The CE device 10 enables a terminal device to connect to the IP/MPLS network 30. The terminal device may be, for example, a mobile phone, a pad computer, a laptop computer, a desktop computer, or any other devices with wired and/or wireless communication capability. The CE device 10 may be, for example, a router, a switch, a gateway, a modem, a firewall, a network interface controller (NIC), a hub, a bridge, or any other type of data transfer device. The PE device 20-1/20-2 enables the CE device 10 to connect to the IP/MPLS network 30. The PE device 20-1/20-2 may be, for example, a router, a switch, a gateway, a modem, a firewall, an NIC, a hub, a bridge, or any other type of data transfer device.

The CE device 10 is multihomed to the PE devices 20-1 and 20-2 via an Ethernet segment which comprises a link between the CE device 10 and the PE device 20-1 and a link between the CE device 10 and the PE device 20-2. The Ethernet segment can be identified by an Ethernet segment identifier (ESI). The ESI may be manually configured or automatically derived. Once the ESI for the Ethernet segment is assigned for the CE device 10, it may be advertised by the PE devices 20-1 and 20-2 through Ethernet Segment Route defined in RFC 7432 and related protocols. Thus, the PE devices 20-1 and 20-2 can automatically discover that they are both connected to the same Ethernet segment.

The IP/MPLS network 30 can route and/or forward traffic provided via the EVPN. The IP/MPLS network 30 may be, for example, an IP based network, or an MPLS based network, or a combination thereof. As an exemplary example, it is assumed that an enterprise has multiple data centers at different locations. Then, the EVPN may be used to interconnect these data centers in a secured way. Specifically, the data center at each location may be connected to the IP/MPLS network 30 via corresponding CE and PE devices such that the multiple data centers can be interconnected with each other.

Figure 2:
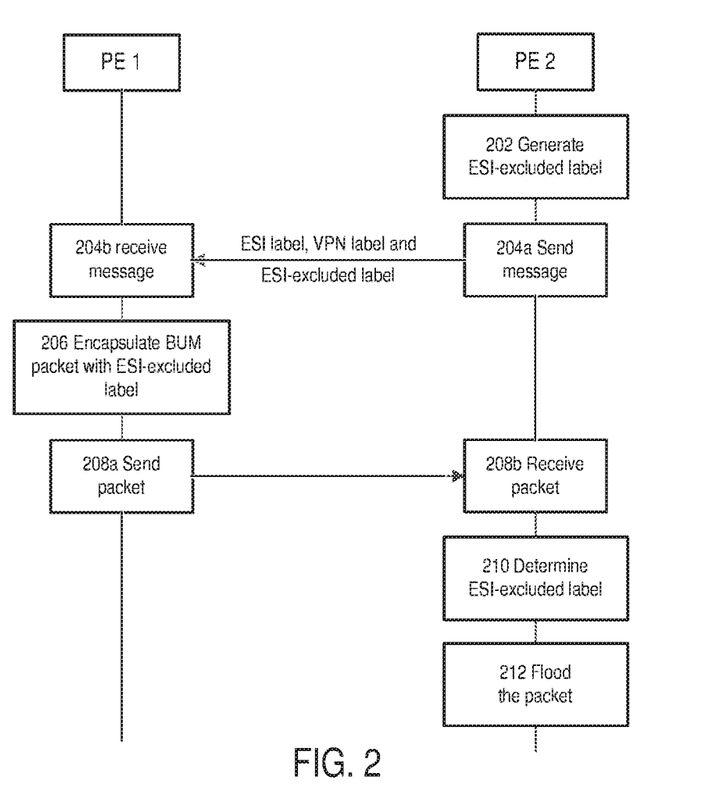
FIG. 2 is a flowchart illustrating a process according to an embodiment of the disclosure.

FIG. 2 is a flowchart illustrating a process according to an embodiment of the disclosure. In this embodiment, it is assumed that the PE device 20-1 (simply denoted as PE 1) is an ingress PE device which receives a packet of BUM traffic from the CE device 10. It is also assumed that the PE device 20-2 (simply denoted as PE 2) is an egress PE device which receives the packet from the PE 1 through ingress replication.

At step 202, the PE 2 generates, in correspondence with a label combination of an ESI label and a VPN label, an ESI-excluded label. The ESI label may be downstream assigned by the PE 2 to the PE 1 through the Ethernet Auto-Discovery Route, as defined in RFC 7432 and related protocols. The VPN label may be advertised by the PE 2 to the PE 1 through the Provider Multicast Service Interface (PMSI) tunnel attribute for the Inclusive Multicast Ethernet Tag Route, as defined in RFC 7432 and related protocols.

The ESI-excluded label is an MPLS label excluding an ESI label, which can be used between an ingress PE device and an egress PE device to replace a corresponding label combination of an ESI label and a VPN label to identify a broadcast port list on the egress PE device. The ESI-excluded label may be generated by selecting an unused MPLS label from the MPLS label space of the PE 2. Optionally, when several <ESI, VPN> label combinations identify the same egress broadcast port list, only one ESI-excluded label may be allocated to save label resource. That is, each ESI-excluded label may be configured to uniquely identify a different egress broadcast port list on the PE 2.

Once the ESI-excluded label is generated, it may be associated by the control plane (e.g., part of the control software) of the PE 2 with the broadcast port list on the PE 2, since the label combination of ESI and VPN labels have uniquely identified this broadcast port list. Then, the association between the ESI-excluded label and the broadcast port list may be provided to the data plane (e.g., the switching chipset) of the PE 2. In this way, the ESI-excluded label itself identifies the egress broadcast port list on the PE 2.

Figure 3A:
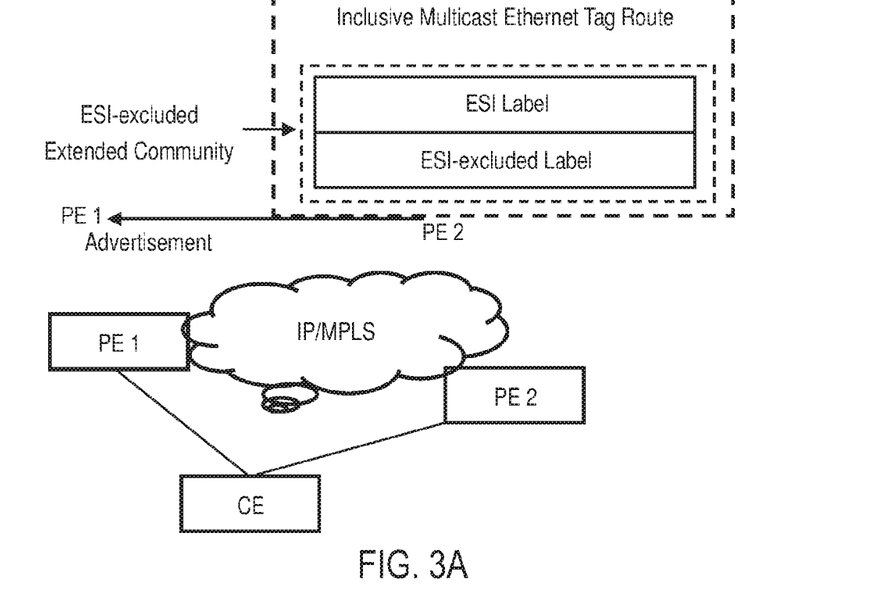
FIGS. 3A-3B are schematic diagrams for explaining the process of FIG. 2.

At step 204a, the PE 2 sends, to the PE 1, a message that comprises the ESI label, the VPN label and the ESI-excluded label. Correspondingly, at step 204b, the PE 1 receives the message from the PE 2. For example, as shown in FIG. 3A, the message may be a BGP advertisement generated by introducing an ESI-excluded extended community for the "Inclusive Multicast Ethernet Tag Route" defined in RFC 7432 and related protocols. The ESI-excluded extended community includes the ESI label and the ESI-excluded label, since the VPN label has been included in the "Inclusive Multicast Ethernet Tag Route". In this way, the correspondence (or mapping relationship) between the ESI-excluded label and the label combination can be indicated.

As another example, it is also possible to define a new BGP advertisement including the ESI label, the VPN label and the ESI-excluded label. This new BGP advertisement may be sent separately from the "Inclusive Multicast Ethernet Tag Route".

Figure 3B:
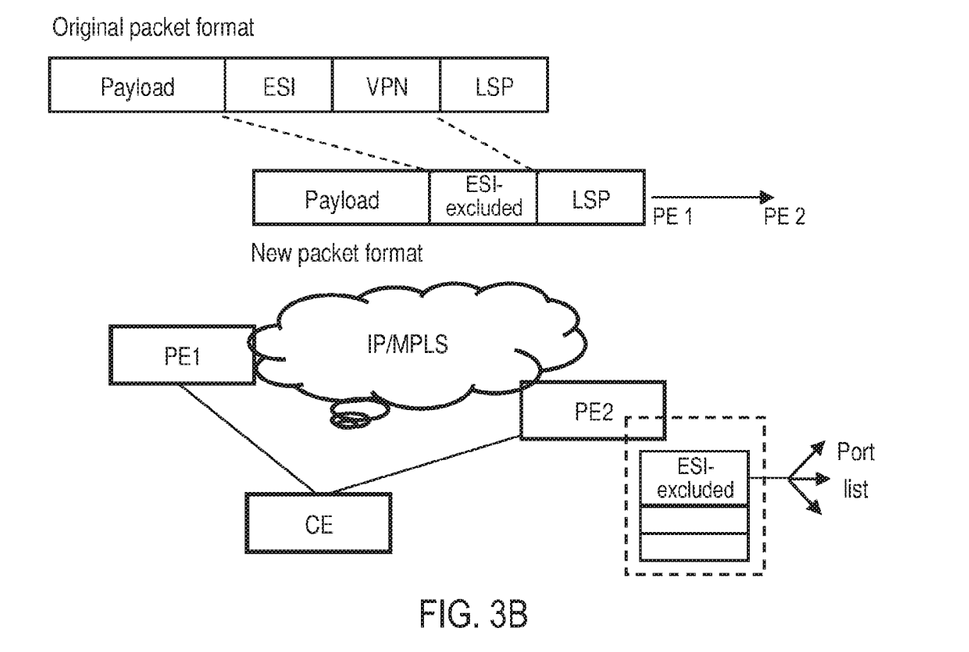

At step 206, the PE 1 encapsulates the packet of BUM traffic, with the ESI-excluded label instead of the label combination. As shown in FIG. 3B, the packet targeted to the PE2 is originally encapsulated as <ESI, VPN, LSP>. In contrast, in this embodiment, the packet targeted to the PE2 is encapsulated as <ESI-excluded, LSP>. That is, the label combination is replaced with the ESI-excluded label.

At step 208a, the PE 1 sends the encapsulated packet to the PE 2. This can be done through ingress replication as defined in RFC 7432 and related protocols. Correspondingly, at step 208b, the PE 2 receives the encapsulated packet.

At step 210, the PE 2 determines the ESI-excluded label from the encapsulated packet of BUM traffic. As shown in FIG. 3B, once the packet is received and the LSP is terminated, the ESI-excluded label is then the top label in the packet. Thus, the top label may be determined as the ESI-excluded label.

At step 212, the PE 2 floods the packet of BUM traffic according to the determined ESI-excluded label. The flooding of the packet may be performed through ingress replication and/or P2MP LSP. As described above, the association between the ESI-excluded label and the broadcast port list has been provided to the data plane (e.g., the switching chipset) of the PE 2. Thus, the PE 2 may flood the packet to the broadcast port list corresponding to the ESI-excluded label. Since this is a typical MPLS forwarding behavior, the conventional commercial switching chipsets can still be used in the PE 2.

In this way, the data path of the existing network devices will not be affected. The only cost is that an additional label is consumed on PE label space, corresponding to each <ESI, VPN> combination. This means when deploying an EVPN, there is no need to replace the hardware of network devices and it only needs to upgrade the software in the control plane. This can bring cost saving.

In addition, since the label combination is replaced with a single label for encapsulation of BUM packet(s), the consumption of the MPLS label stack depth can be decreased by one label. This is helpful for most switching chipsets which have limited depth capability.

Figure 4:
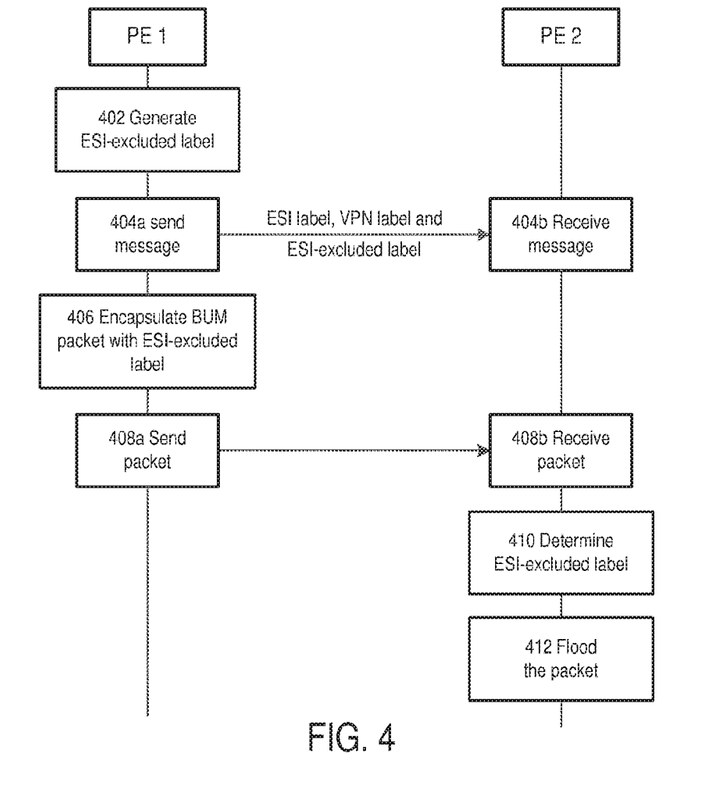
FIG. 4 is a flowchart illustrating a process according to another embodiment of the disclosure.

FIG. 4 is a flowchart illustrating a process according to another embodiment of the disclosure. This embodiment is similar to that of FIG. 2 except that the PE 1 forwards the packet of BUM traffic to the PE 2 through P2MP LSP.

At step 402, the PE 1 generates, in correspondence with a label combination of an ESI label and a VPN label, an ESI-excluded label. The ESI label may be upstream assigned by the PE 1 to the PE 2 through the Ethernet Auto-Discovery route, as defined in RFC 7432 and related protocols. The VPN label may be advertised by the PE 1 to the PE 2 through the PMSI tunnel attribute for the Inclusive Multicast Ethernet Tag Route, as defined in RFC 7432 and related protocols. The ESI-excluded label may be generated by the PE 1 in a way similar to the embodiment of FIG. 2.

At step 404a, the PE 1 sends, to the PE 2, a message that comprises the ESI label, the VPN label and the ESI-excluded label. Similar to the embodiment of FIG. 2, the message may be a BGP advertisement generated by introducing an ESI-excluded extended community for the "Inclusive Multicast Ethernet Tag Route" defined in RFC 7432 and related protocols. The ESI-excluded extended community includes the ESI label and the ESI-excluded label. It is also possible to define a new BGP advertisement including the ESI label, the VPN label and the ESI-excluded label. This new BGP advertisement may be sent separately from the "Inclusive Multicast Ethernet Tag Route".

Correspondingly, at step 404b, the PE 2 receives the message from the PE 1. As a result, the ESI-excluded label can be shared to the PE 2 and the correspondence (or mapping relationship) between the ESI-excluded label and the label combination can be known by the PE 2. Similar to the embodiment of FIG. 2, the ESI-excluded label may be associated by the control plane (e.g., part of the control software) of the PE 2 with the broadcast port list on the PE 2. Then, the association between the ESI-excluded label and the broadcast port list may be provided to the data plane (e.g., the switching chipset) of the PE 2.

At step 406, the PE 1 encapsulates the packet of BUM traffic, with the ESI-excluded label instead of the label combination. Step 406 may be similar to step 206 of FIG. 2. At step 408a, the PE 1 sends the encapsulated packet to the PE 2. This can be done through P2MP LSP as defined in RFC 7432 and related protocols. Correspondingly, at step 408b, the PE 2 receives the encapsulated packet.

At step 410, the PE 2 determines the ESI-excluded label from the encapsulated packet of BUM traffic. Step 410 may be similar to step 210 of FIG. 2. At step 412, the PE 2 floods the packet of BUM traffic according to the determined ESI-excluded label. Step 412 may be similar to step 212 of FIG. 2. It should be noted that for the purpose of brevity, only two PE devices are discussed in the processes shown in FIGS. 2 and 4. When there are more than two PE devices (PE 1, PE 2, . . . , PE n) connected to the same CE device, the process shown in FIG. 2 or 4 is performed between PE 1 (the ingress PE) and each of the remaining PEs (the egress PEs).

Figure 5:
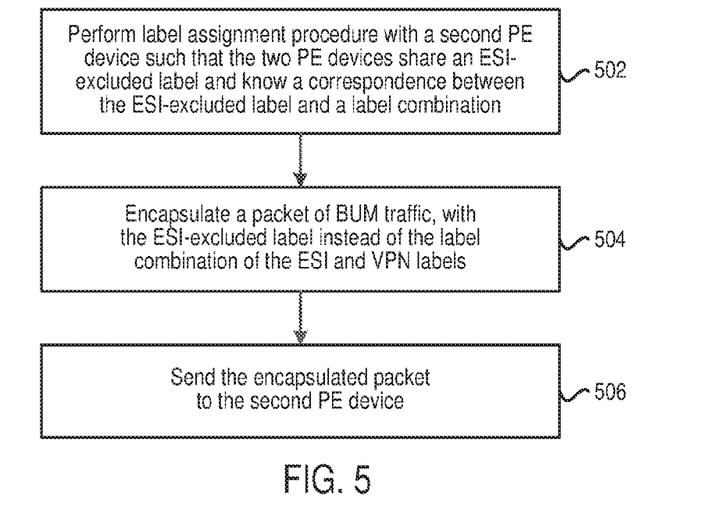
FIG. 5 is a flowchart illustrating a method implemented at a first PE device according to an embodiment of the disclosure.

FIG. 5 is a flowchart illustrating a method implemented at a first PE device according to an embodiment of the disclosure. At step 502, the first PE device performs label assignment procedure with a second PE device such that the first and second PE devices share an ESI-excluded label and know a correspondence between the ESI-excluded label and a label combination of an ESI label and a VPN label. Step 502 may be implemented as step 204b of FIG. 2 or steps 402 and 404a of FIG. 4.

At step 504, a packet of BUM traffic is encapsulated with the ESI-excluded label instead of the label combination. Step 504 may correspond to step 206 of FIG. 2 or step 406 of FIG. 4. At step 506, the encapsulated packet is sent to the second PE device. Step 506 may correspond to step 208a of FIG. 2 or step 408a of FIG. 4.

Figure 6:
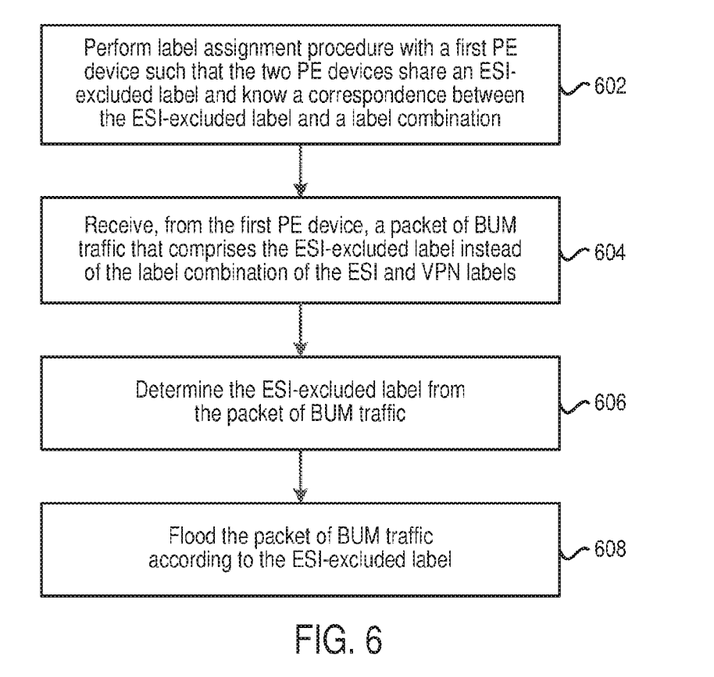
FIG. 6 is a flowchart illustrating a method implemented at a second PE device according to an embodiment of the disclosure.

FIG. 6 is a flowchart illustrating a method implemented at a second PE device according to an embodiment of the disclosure. At step 602, the second PE device performs label assignment procedure with a first PE device such that the first and second PE devices share an ESI-excluded label and know a correspondence between the ESI-excluded label and a label combination of an ESI label and a VPN label. Step 602 may be implemented as steps 202 and 204a of FIG. 2 or step 404b of FIG. 4.

At step 604, a packet of BUM traffic that comprises the ESI-excluded label instead of the label combination is received from the first PE device. Step 604 may correspond to step 208b of FIG. 2 or step 408b of FIG. 4. At step 606, the ESI-excluded label is determined from the packet of BUM traffic. Step 606 may correspond to step 210 of FIG. 2 or step 410 of FIG. 4. At step 608, the packet of BUM traffic is flooded according to the ESI-excluded label. Step 608 may correspond to step 212 of FIG. 2 or step 412 of FIG. 4. It should be noted that two steps shown in succession may, in fact, be executed substantially concurrently, or the steps may sometimes be executed in the reverse order, depending upon the functionality involved.

Figure 7:
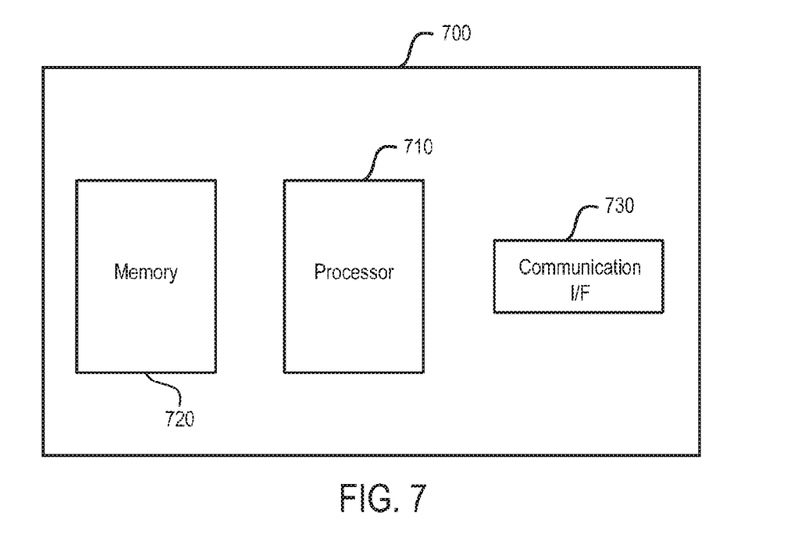
FIG. 7 is a block diagram showing an apparatus suitable for use in practicing some embodiments of the disclosure.

FIG. 7 is a block diagram showing an apparatus suitable for use in practicing some embodiments of the disclosure. For example, any one of the PE devices 20-1 and 20-2 may be implemented through the apparatus 700. As shown, the apparatus 700 may include a processor 710, a memory 720 that stores a program, and a communication interface 730 for communicating data with other external devices through wired and/or wireless communication.

The program includes program instructions that, when executed by the processor 710, enable the apparatus 700 to operate in accordance with the embodiments of the present disclosure, as discussed above. That is, the embodiments of the present disclosure may be implemented at least in part by computer software executable by the processor 710, or by hardware, or by a combination of software and hardware.

The memory 720 may be of any type suitable to the local technical environment and may be implemented using any suitable data storage technology, such as semiconductor based memory devices, flash memory, magnetic memory devices and systems, optical memory devices and systems, fixed memory and removable memory. The processor 710 may be of any type suitable to the local technical environment, and may include one or more of general purpose computers, special purpose computers, microprocessors, digital signal processors (DSPs) and processors based on multi-core processor architectures, as non-limiting examples.

As another embodiment, a first PE device may comprise a label assignment module, an encapsulation module and a sending module. The label assignment module is configured to perform label assignment procedure with a second PE device such that the first and second PE devices share an ESI-excluded label and know a correspondence between the ESI-excluded label and a label combination of an ESI label and a VPN label. The encapsulation module is configured to encapsulate a packet of BUM traffic, with the ESI-excluded label instead of the label combination. The sending module is configured to send the encapsulated packet to the second PE device.

For example, the label assignment module may be configured to receive, from the second PE device, a message that comprises the ESI label, the VPN label and the ESI-excluded label. The sending module may be configured to send the encapsulated packet to the second PE device through ingress replication.

As another example, the label assignment module may be configured to generate, in correspondence with the label combination of the ESI and VPN labels, the ESI-excluded label, and to send, to the second PE device, a message that comprises the ESI label, the VPN label and the ESI-excluded label. The sending module may be configured to send the encapsulated packet to the second PE device through P2MP LSP.

As still another embodiment, a second PE device may comprise a label assignment module, a reception module, a determination module and a flooding module. The label assignment module is configured to perform label assignment procedure with a first PE device such that the first and second PE devices share an ESI-excluded label and know a correspondence between the ESI-excluded label and a label combination of an ESI label and a VPN label. The reception module is configured to receive, from the first PE device, a packet of BUM traffic that comprises the ESI-excluded label instead of the label combination. The determination module is configured to determine the ESI-excluded label from the packet of BUM traffic. The flooding module is configured to flood the packet of BUM traffic according to the ESI-excluded label.

For example, the label assignment module may be configured to generate, in correspondence with the label combination of the ESI and VPN labels, the ESI-excluded label, and to send, to the first PE device, a message that comprises the ESI label, the VPN label and the ESI-excluded label. The reception module may be configured to receive the packet of BUM traffic from the first PE device through ingress replication.

As another example, the label assignment module may be configured to receive, from the first PE device, a message that comprises the ESI label, the VPN label and the ESI-excluded label. The reception module may be configured to receive the packet of BUM traffic from the first PE device through P2MP LSP.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a first provider edge (PE) device in an Ethernet virtual private network (EVPN), the method comprising:
   performing label assignment procedure with a second PE device such that the first and second PE devices share an Ethernet segment identifier (ESI)-excluded label and know a correspondence between the ESI-excluded label and a label combination of an ESI label and a VPN label;
   encapsulating a packet of broadcast, unknown unicast or multicast (BUM) traffic, with the ESI-excluded label instead of the label combination; and
   sending the encapsulated packet to the second PE device.

2. The method according to claim 1, wherein performing the label assignment procedure with the second PE device comprises:
   receiving, from the second PE device, a message that comprises the ESI label, the VPN label and the ESI-excluded label; and
   wherein the encapsulated packet is sent to the second PE device through ingress replication.

3. The method according to claim 1, wherein performing the label assignment procedure with the second PE device comprises:
   generating, in correspondence with the label combination of the ESI and VPN labels, the ESI-excluded label; and
   sending, to the second PE device, a message that comprises the ESI label, the VPN label and the ESI-excluded label; and
   wherein the encapsulated packet is sent to the second PE device through point to multipoint (P2MP) label switched path (LSP).

4. The method according to claim 2, wherein the message is an advertisement of border gateway protocol (BGP) comprising: information about Inclusive Multicast Ethernet Tag Route including the VPN label; and an extended community including the ESI label and the ESI-excluded label.

5. The method according to claim 1, wherein each ESI-excluded label is configured to uniquely identify a different egress broadcast port list on the second PE.

6. A method implemented at a second provider edge (PE) device in an Ethernet virtual private network (EVPN), the method comprising:
   performing label assignment procedure with a first PE device such that the first and second PE devices share an Ethernet segment identifier (ESI)-excluded label and know a correspondence between the ESI-excluded label and a label combination of an ESI label and a VPN label;
   receiving, from the first PE device, a packet of broadcast, unknown unicast or multicast (BUM) traffic that comprises the ESI-excluded label instead of the label combination;
   determining the ESI-excluded label from the packet of BUM traffic; and
   flooding the packet of BUM traffic according to the ESI-excluded label.

7. The method according to claim 6, wherein performing label assignment procedure with the first PE device comprises:
   generating, in correspondence with the label combination of the ESI and VPN labels, the ESI-excluded label; and
   sending, to the first PE device, a message that comprises the ESI label, the VPN label and the ESI-excluded label; and
   wherein the packet of BUM traffic is received from the first PE device through ingress replication.

8. The method according to claim 6, wherein performing label assignment procedure with the first PE device comprises:
   receiving, from the first PE device, a message that comprises the ESI label, the VPN label and the ESI-excluded label; and
   wherein the packet of BUM traffic is received from the first PE device through point to multipoint (P2MP) label switched path (LSP).

9. The method according to claim 7, wherein the message is an advertisement of border gateway protocol (BGP) comprising: information about Inclusive Multicast Ethernet Tag Route including the VPN label; and an extended community including the ESI label and the ESI-excluded label.

10. The method according to claim 6, wherein each ESI-excluded label is configured to uniquely identify a different egress broadcast port list on the second PE.

11. A first provider edge (PE) device in an Ethernet virtual private network (EVPN), the first PE device comprising:
a processor; and
a memory, the memory containing instructions executable by the processor, whereby the first PE device is operative to:
perform label assignment procedure with a second PE device such that the first and second PE devices share an Ethernet segment identifier (ESI)-excluded label and know a correspondence between the ESI-excluded label and a label combination of an ESI label and a VPN label;
encapsulate a packet of broadcast, unknown unicast or multicast (BUM) traffic, with the ESI-excluded label instead of the label combination; and
send the encapsulated packet to the second PE device.

12. The first PE device according to claim 11, wherein the first PE device is operative to perform label assignment procedure with the second PE device by:
receiving, from the second PE device, a message that comprises the ESI label, the VPN label and the ESI-excluded label; and
wherein the first PE device is operative to send the encapsulated packet to the second PE device through ingress replication.

13. The first PE device according to claim 11, wherein the first PE device is operative to perform label assignment procedure with the second PE device by:
generating, in correspondence with the label combination of the ESI and VPN labels, the ESI-excluded label; and
sending, to the second PE device, a message that comprises the ESI label, the VPN label and the ESI-excluded label; and
wherein the first PE device is operative to send the encapsulated packet to the second PE device through point to multipoint (P2MP) label switched path (LSP).

14. The first PE device according to claim 12, wherein the message is an advertisement of border gateway protocol (BGP) comprising: information about Inclusive Multicast Ethernet Tag Route including the VPN label; and an extended community including the ESI label and the ESI-excluded label.

15. The first PE device according to claim 11, wherein each ESI-excluded label is configured to uniquely identify a different egress broadcast port list on the second PE.

16. The first PE device according to claim 11, wherein the processor comprises a chipset capable of supporting multi-protocol label switching (MPLS) label push, pop and forwarding.

17. A second provider edge (PE) device in an Ethernet virtual private network (EVPN), the second PE device comprising:
a processor; and
a memory, the memory containing instructions executable by the processor, whereby the second PE device is operative to:
perform label assignment procedure with a first PE device such that the first and second PE devices share an Ethernet segment identifier (ESI)-excluded label and know a correspondence between the ESI-excluded label and a label combination of an ESI label and a VPN label;
receive, from the first PE device, a packet of broadcast, unknown unicast or multicast (BUM) traffic that comprises the ESI-excluded label instead of the label combination;
determine the ESI-excluded label from the packet of BUM traffic; and
flood the packet of BUM traffic according to the ESI-excluded label.

18. The second PE device according to claim 17, wherein the second PE device is operative to perform label assignment procedure with the first PE device by:
generating, in correspondence with the label combination of the ESI and VPN labels, the ESI-excluded label; and
sending, to the first PE device, a message that comprises the ESI label, the VPN label and the ESI-excluded label; and
wherein the second PE device is operative to receive the packet of BUM traffic from the first PE device through ingress replication.

19. The second PE device according to claim 17, wherein the second PE device is operative to perform label assignment procedure with the first PE device by:
receiving, from the first PE device, a message that comprises the ESI label, the VPN label and the ESI-excluded label; and
wherein the second PE device is operative to receive the packet of BUM traffic from the first PE device through point to multipoint (P2MP) label switched path (LSP).

20. The second PE device according to claim 18, wherein the message is an advertisement of border gateway protocol (BGP) comprising: information about Inclusive Multicast Ethernet Tag Route including the VPN label; and an extended community including the ESI label and the ESI-excluded label.

21. The second PE device according to claim 17, wherein each ESI-excluded label is configured to uniquely identify a different egress broadcast port list on the second PE.

22. The second PE device according to claim 17, wherein the processor comprises a chipset capable of supporting multi-protocol label switching (MPLS) label push, pop and forwarding.

23. A computer program product stored on a non-transitory computer readable storage medium comprising instructions which when executed by at least one processor, cause the at least one processor to perform the method according to claim 1.

24. A non-transitory computer readable storage medium comprising instructions which when executed by at least one processor, cause the at least one processor to perform the method according to claim 1.

* * * * *